US008413295B2

(12) United States Patent
Campbell

(10) Patent No.: US 8,413,295 B2
(45) Date of Patent: Apr. 9, 2013

(54) CASTER WHEEL SYSTEM

(76) Inventor: Glenn Campbell, Clean Lake, MN (US)

( * ) Notice: Subject to any disclaimer, the term of this patent is extended or adjusted under 35 U.S.C. 154(b) by 620 days.

(21) Appl. No.: 12/229,820

(22) Filed: Aug. 27, 2008

(65) Prior Publication Data

US 2011/0131761 A1 Jun. 9, 2011

(51) Int. Cl.
*B60B 33/00* (2006.01)
(52) U.S. Cl. ............. 16/35 D; 16/29; 16/31 A; 16/31 R; 16/40; 16/42 T
(58) Field of Classification Search ................... 16/18 A, 16/18 R, 19, 20, 29, 31 A, 31 R, 35 D, 40, 16/42 R, 42 T; 280/47.34, 47.35, 79.11
See application file for complete search history.

(56) References Cited

U.S. PATENT DOCUMENTS

| 1,899,394 | A | * | 2/1933 | Noelting ............................ 16/38 |
| 2,253,824 | A | * | 8/1941 | Townsend et al. ............ 16/35 R |
| 2,425,246 | A | * | 8/1947 | Kalvin ............................... 16/47 |
| 2,461,652 | A | | 2/1949 | Montgomery, Sr. |
| 2,963,732 | A | | 12/1960 | Kramcsak |
| 3,369,270 | A | * | 2/1968 | Garrison ....................... 16/18 R |
| 3,924,292 | A | | 12/1975 | Christensen |
| 4,053,025 | A | | 10/1977 | Slusarenko |
| 4,097,954 | A | | 7/1978 | Christensen |
| 4,280,246 | A | | 7/1981 | Christensen |
| 4,312,096 | A | | 1/1982 | Schubert et al. |
| 4,414,702 | A | * | 11/1983 | Neumann ..................... 16/35 R |
| 4,432,116 | A | | 2/1984 | Schultz |
| 4,485,521 | A | | 12/1984 | Welsch et al. |
| 4,709,444 | A | * | 12/1987 | Black ............................ 16/31 A |
| 4,814,424 | A | * | 3/1989 | Suzumori et al. ............. 528/249 |
| 4,969,232 | A | | 11/1990 | Michel |
| 5,121,808 | A | * | 6/1992 | Visentini et al. .............. 180/435 |
| 5,240,276 | A | | 8/1993 | Coombs |
| 5,813,090 | A | | 9/1998 | Miles |
| 5,842,672 | A | | 12/1998 | Sweere et al. |
| 6,149,169 | A | | 11/2000 | Chelgren |
| 6,409,196 | B1 | | 6/2002 | McFarland |
| 6,499,184 | B2 | | 12/2002 | Plate |
| 6,641,228 | B2 | * | 11/2003 | Liu .......................... 301/111.06 |
| 6,796,568 | B2 | | 9/2004 | Martis |
| 6,810,561 | B1 | * | 11/2004 | Liu ............................... 16/42 T |
| 6,944,910 | B2 | | 9/2005 | Pauls |
| 7,093,319 | B2 | | 8/2006 | Lemeur, Jr. et al. |
| 7,353,566 | B2 | * | 4/2008 | Scheiber et al. .................. 16/19 |
| 2004/0003482 | A1 | * | 1/2004 | Schreiber et al. ............. 16/18 R |

OTHER PUBLICATIONS

International Search Report with Notification for PCT/US/09/03456 (3 Pages).
Written Opinion of the International Searching Authority for PCT/US/09/03456 (15 Pages).

* cited by examiner

*Primary Examiner* — Victor Batson
*Assistant Examiner* — Roberta Delisle
(74) *Attorney, Agent, or Firm* — Hager Wilks & Archer LLP; Mark A. Ekse

(57) ABSTRACT

A caster wheel system comprising an axle assembly, wheel fork assembly and pivot block assembly. The axle assembly operationally couples the system to a vehicle, the wheel fork assembly includes a wheel rotatably coupled to a wheel fork member, the pivot block provides a coupling interface between the axle assembly and the wheel fork assembly, the pivot block assembly also has a bumper which acts to inhibit flutter and allow the wheel fork assembly to pivot slightly backwards when sufficient weight is applied to inhibit tipping where only three wheels of a four wheel system contact the ground, thereby allowing all wheels to contact the ground during operation.

25 Claims, 5 Drawing Sheets

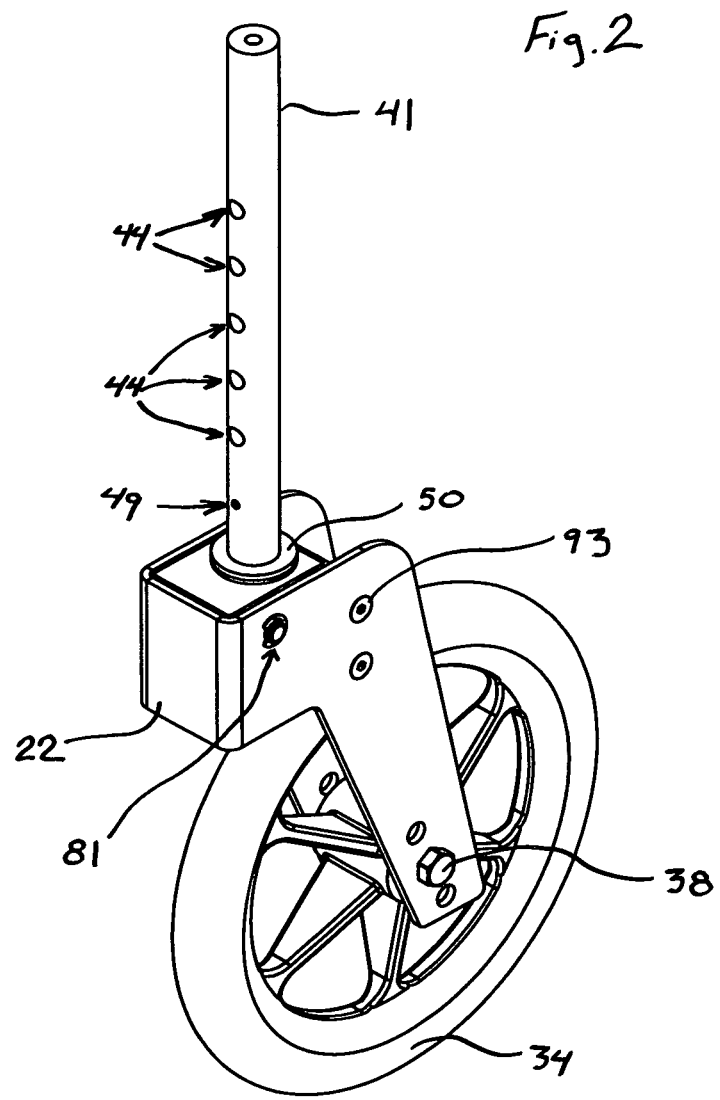

CASTER WHEEL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON COMPACT DISC

Not Applicable.

BACKGROUND OF THE INVENTION

1. Field of the Invention

The present invention relates generally to improvements in caster wheel assemblies in the type used in conjunction with manually moved vehicles and carriages. By way of example and not limitation, manually moved vehicles and carriages (collectively referred to hereafter as "vehicles") include: wheel chairs, grocery carts, dollies, warehouse carts, gurneys, equipment and media carts, IV stands, baby carriages, scooters, and other similar products where fluid motion with limited or no flutter is desired. Additionally, it is a common occurrence through normal wear of four wheel systems, that three wheels will be in contact with the ground, while the fourth wheel is not in effective use. This occurs in part because three points, or in this case wheels, determine a plane. Without a means to adjust the height of the wheels or align them, the vehicle is subject to tipping.

2. Description of Related Art

Several different structures have been utilized to attempt to reduce the flutter of caster wheels in the past. Many of these prior structures inherently require increased power from the user or a drive system to accommodate desired turns in an attempt to limit undesired flutter. Others provide no effective means of adjustment accessible by the user. Illustrative examples of such structures include:

U.S. Pat. No. 3,924,292 titled: Anti-Flutter Caster which utilizes a resilient wheel in conjunction with flattered fork surfaces to inhibit turning or fluttering of the caster.

U.S. Pat. No. 4,097,954 titled: Flutter Resistant Caster which replaces some number of traditional ball bearings with resilient rubber-like rolling elements of a greater diameter.

U.S. Pat. No. 2,963,732 titled: Caster Having a Compensator Clip, utilizes a generally U-shaped wire clip to exert a compressive force.

U.S. Pat. No. 4,280,246 titled: Self-Steering Caster, which uses a spring means to provide additional resistance against the directional turning of the caster.

U.S. Pat. No. 4,969,232 titled: Adjustable Caster Wheel Assembly that utilizes a conical bushing positioned around the swivel post (axle) of the wheel assembly.

U.S. Pat. No. 6,149,169 titled: Caster Fork with Dampener and utilizes an elasomeric member as a suspension between an upper member and a lower member.

U.S. Pat. No. 6,944,910 titled: Caster Wheel Assembly with Anti-Flutter Control which utilizes a trio of dampening inserts positioned around a spacer and a housing.

U.S. Pat. No. 4,432,116 titled: Caster Shimmy Damper including a Viscous Damping Medium which uses the property of viscous shear to restrict flutter.

None of these system pivot block system in conjunction with a bumper to inhibit flutter while allowing the wheel to pivot slightly backwards and upwards to provide a weight driven alignment to allow all four wheels of a four wheel system to contact the ground in normal operation.

BRIEF SUMMARY OF THE INVENTION

A caster wheel system comprising an axle assembly, wheel fork assembly and pivot block assembly. The axle assembly operationally couples the system to a vehicle, the wheel fork assembly includes a wheel rotatably coupled to a wheel fork member, the pivot block provides a coupling interface between the axle assembly and the wheel fork assembly, the pivot block assembly also has a bumper which acts to inhibit flutter and allow the wheel fork assembly to pivot slightly backwards when sufficient weight is applied to inhibit tipping where only three wheels of a four wheel system contact the ground, thereby allowing all wheels to contact the ground during operation.

BRIEF DESCRIPTION OF THE SEVERAL VIEWS OF THE DRAWINGS

FIG. 2 is a perspective view of the present invention when fully assembled.

DETAILED DESCRIPTION OF THE INVENTION

Figure 1:
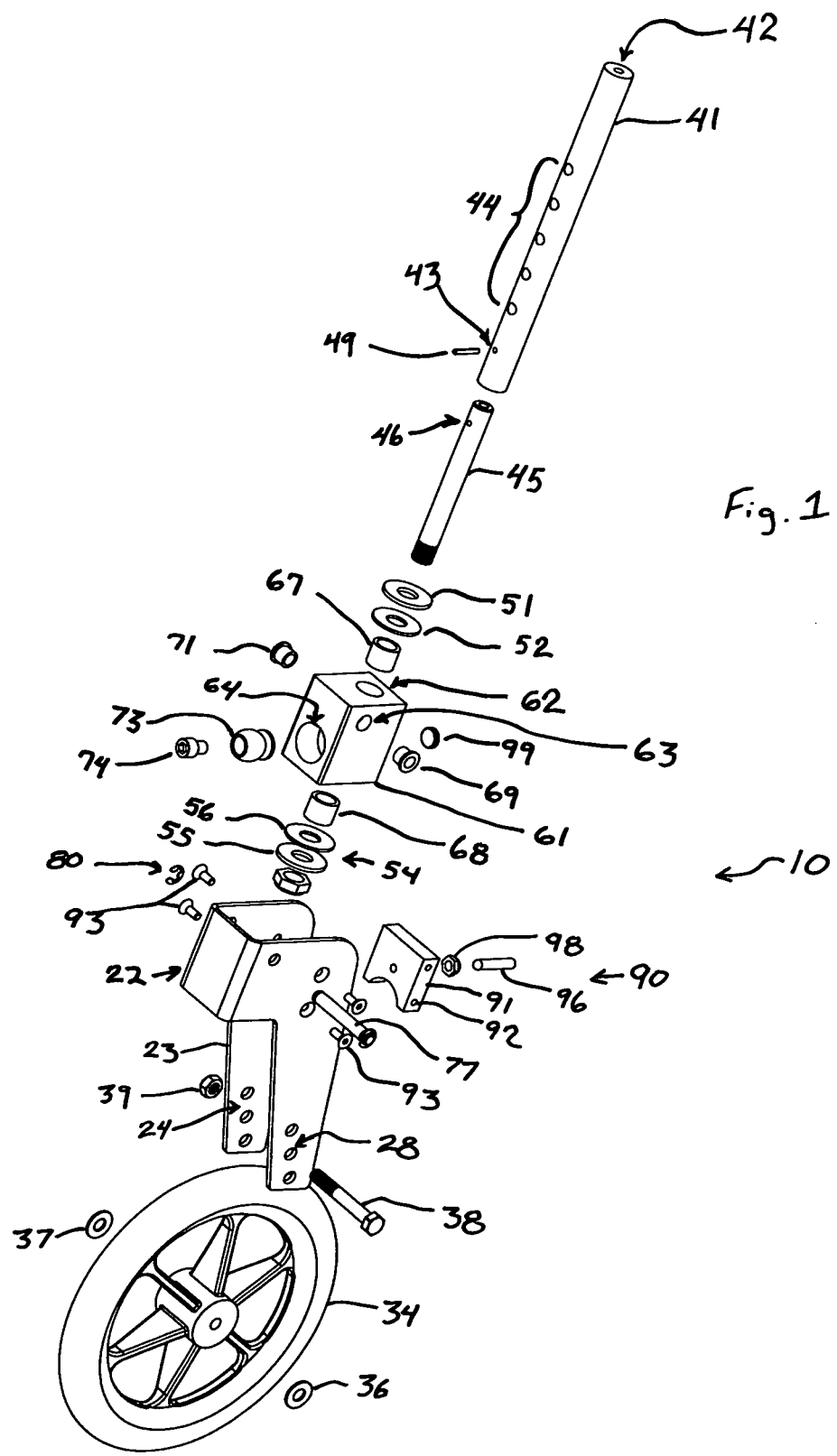
FIG. 1 is an exploded perspective view of components forming the present invention.
Figure 4:
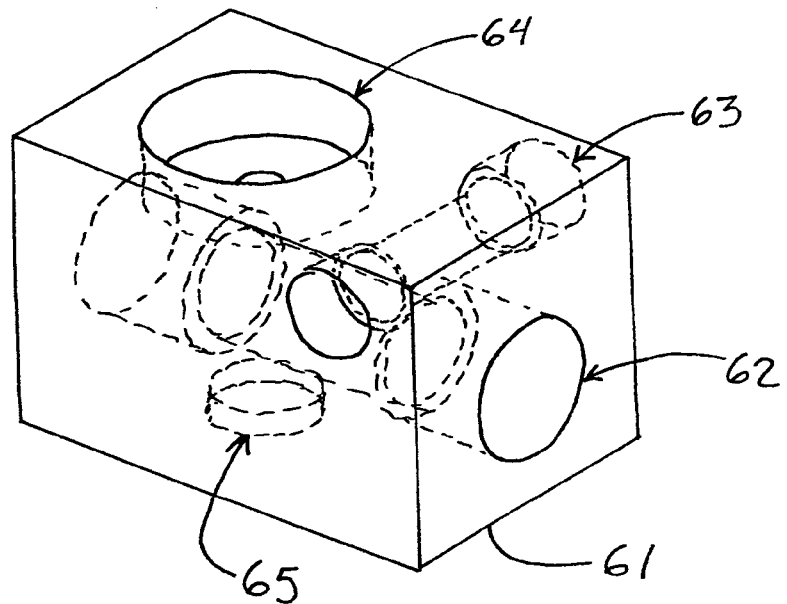
FIG. 4 is a perspective view of the pivot block of the present invention.
Figure 3:
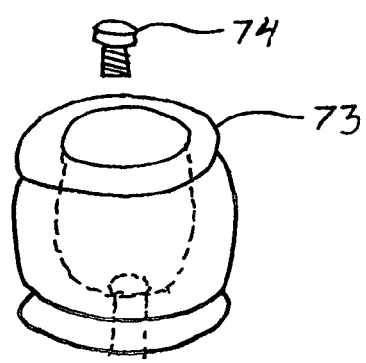
FIG. 3 is a perspective view of the bumper assembly of the present invention.
Figure 5:
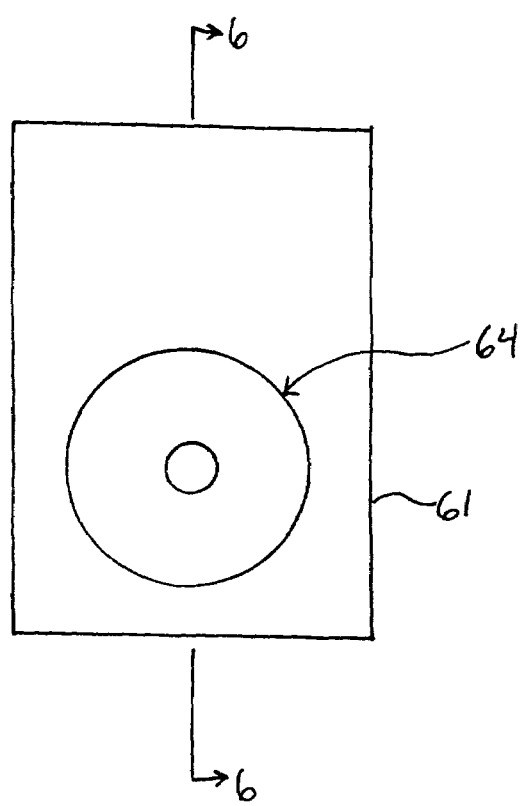
FIG. 5 is a rear view of the pivot block of the present invention.
Figure 6:
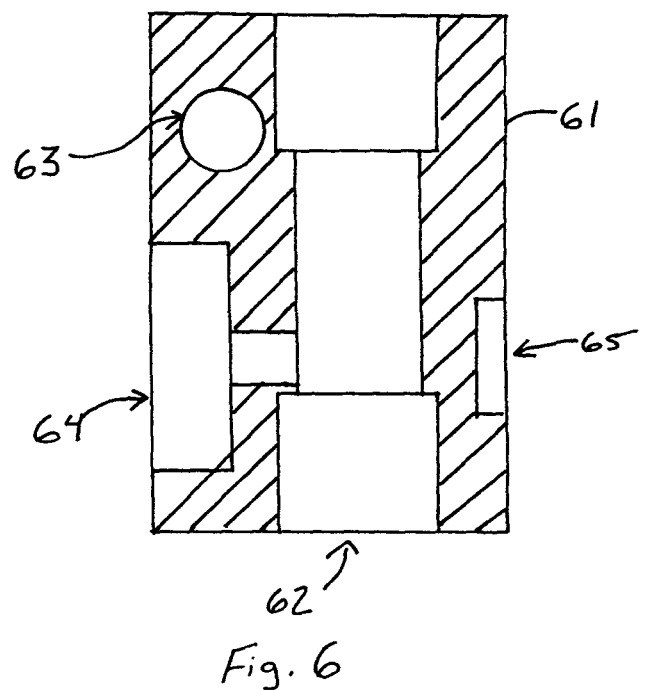
FIG. 6 is a cross-sectional view of the pivot block of the present invention taken along line 6-6 of FIG. 5.

The caster wheel system briefly described above and illustrated in FIGS. 1 through 6 will now be described in more detail. While several individual components are combined to manufacture the caster wheel system of the present invention, it may be beneficial to consider the system in terms of four assemblies and their respective interrelations. For the purposes of clarity of explanation, the four assemblies discussed shall be a Wheel Fork Assembly, Axle Assembly, Pivot Block Assembly and optionally a Load Block Assembly.

The Caster Wheel System 10 generally comprises a wheel 34, a fork member 22, an axle bolt 38 for rotatably coupling the wheel 34 to the fork member 22, and a nut 39 for securing the axle bolt 38.

In an embodiment, the fork member 22 has two side portions 23, 27 in a spaced arrangement for extending along either side of the wheel 34 and a front portion 31 joining the first side portion 23 to the second side portion 27. Preferably, each side portion 23, 27 has an aperture 24, 28 extending through a section of the side face distal from the front portion for receiving the axle bolt 38. Thus, the wheel 34 can be attached to the fork member 22 by positioning the axle bolt 38 through the aperture 24 in the first side portion 23, an aperture through the axis of the wheel 34 and the aperture 28 of the second side portion 27. Optionally a flat washer 36,37 may be positioned between an interior face of each of the side portions 23,27 and the wheel 34 to act as bearings between the wheel 34 and the fork member 22.

In another embodiment, the fork member 22 has a plurality of apertures 24, 28 extending through the distal section of each side portion 23,27 of the fork member 22. Thus, the height of the wheel 34 referenced to the top of the wheel fork assembly 20 is adjustable by selecting a matched pair of apertures 24, 28 for receiving the axle bolt 38.

The Axle Assembly 40 generally comprises an axle, a top bearing 50, a bottom bearing 54 and a fastener member 48.

The axle is used to couple the caster wheel system 10 to the vehicle and allows the wheel fork assembly 20 to pivot around a longitudinal axis of the axle assembly 40.

In a preferred embodiment the axle has two segments. The first axle segment 41 is an elongate member with a bore 42 extending along the longitudinal axis of the first axle segment 41. The first axle segment is adapted for mounting the caster wheel system 10 to the vehicle. The second axle segment 45 is also an elongate member. The second elongate member 45 has a circumference slightly smaller than the bore extending through the first elongate member 41, allowing a portion of the second elongate member 45 to be positioned within the bore 42. The end of the first axle segment 41 adjacent to the second axle segment 45 forms a shoulder for abutting the top bearing 50.

In a further embodiment, the axle assembly 40 further includes a first coupling aperture 43 extending through the first elongate member 41 substantially perpendicular to the longitudinal axis of the axle assembly 40, a second coupling aperture 46 extending through the second elongate member 45 also substantially perpendicular to the longitudinal axis of the axle assembly 40 and a coupling means 49 positionable through the first 43 and second coupling apertures 46 when a portion of the second elongate member 45 is positioned in the bore 42 of the first elongate member 41. The coupling means 49 could be a bolt and nut combination, a cotter pin, a screw, rivet, or similar structure, but is most preferably a roll pin sized to have a slight interference fit in both the first 43 and second coupling apertures 46.

While it is possible to use one physical piece for the axle with a shoulder machined into it for receiving the top bearing 50, such a structure generally forms a stress riser and increases the likelihood of mechanical failure.

Additionally, it is important to note that while the axle assembly as described above is the preferred embodiment of the present invention, a flange plate pivotally coupled to the fork member would provide a functionally equivalent means of coupling the system to the vehicle and does not depart of the present invention.

In still a further embodiment a plurality of apertures 44 extend laterally through the first elongate member 41 providing a height adjustment for the coupling of the caster wheel system 10 to the vehicle.

In at least one embodiment, the top 50 and bottom bearings 54 each comprise a first flat washer 51, 55 and a second flat washer 52,56 for reducing friction associated with pivoting the wheel fork assembly 20 around the longitudinal axis of the axle assembly 40. Preferably the second flat washer 52, 56 is made of polyoxymethyene, also known as polyacetal, and sold under the trade name of DELRIN. DELRIN is the registered trademark of E.I. Du Pont de Nemours and Company. Polyoxymethylene is lightweight where resistant thermoplastic with a very low coefficient of friction and can be thought of a substantially self-lubricating.

In a further embodiment, the axle assembly 40 is coupled to the wheel fork assembly 20 by an intermediate pivot block assembly 60, described more fully below. The pivot block assembly 60 is positioned on the second elongate member 45 between the top 50 and bottom bearings 54. Preferably, the pivot block assembly 60 is secured to the axle assembly 40 by the combination of a nut 48 and at least the distal end 47 of the second elongate member 45 being a threaded cylinder for receiving the nut 48. Even more preferably, the nut 48 is either a nut used in conjunction with a lock washer or a lock nut.

The Pivot Block Assembly 60 serves as a coupling interface between the Wheel Fork Assembly 20 and the Axle Assembly 40. Additionally the pivot block assembly 60, in conjunction with the other assemblies significantly reduces the occurrence of undesired side to side motion of the wheel 34 while in use, called "flutter", and the failure of a fourth wheel to contact the ground in use because of a height difference (three points defining a plane), called "tipping". The pivot block assembly 60 generally comprises a pivot block 61, a lateral set of bushings 69, 71, a longitudinal set of bushings 67, 68, a bumper assembly, and a pivot block coupling means 76.

In an embodiment, the pivot block 61 is a rectangular block with a longitudinal bore 62 extending through the pivot block 61. Preferably the longitudinal set of bushings 67, 68 are positioned in the longitudinal bore 62 and serve as an interface between the pivot block 61 and the second elongate member 45 of the axle. The pivot block 61 also includes a lateral bore 63 extending substantially perpendicular to the longitudinal bore 62. The lateral bore 63 is used in conjunction with the pivot block coupling means 76 to pivotally couple the pivot block 61 to the wheel fork assembly 20.

In a further embodiment each one of the set of lateral bushings 69, 71 includes a flanged portion 70, 72. The flanged portion 70, 72 abuts a face of the pivot block 61 when the lateral busing 69, 71 is placed in the lateral bore 63 and serves to reduce the friction between the wheel fork assembly 20 and the pivot block 61 as well as reducing the wear on the pivot block 61. Preferably these lateral bushings are made of brass.

The pivot block 61 also includes a bumper receiving bore 64 extending into the pivot block 61. The axis of the bumper receiving bore 64 is substantially perpendicular to both the longitudinal bore 62 and the lateral bore 63 of the pivot block 61. A bumper 73 may be positioned partially within the bumper receiving bore 64 and is adapted to abut the bottom of the bumper receiving bore 64 and an interior face of the front portion 31 of the fork member 22. The bumper 73 serves as a stabilizer reducing the occurrence of flutter.

Preferably the bumper 73 is compressible and allows the wheel fork assembly 20 to pivot slightly backwards, or "tuck up" when force is applied to the caster wheel system 10 by the weight of the vehicle and or its contents. The wheel fork assembly 20 preferably will tuck up 0.125 inches when 25 pounds or greater force is applied. This slightly backwards pivoting of the wheel fork assembly 20 reduced the likelihood of tipping. The material of the bumper 73 may be changed to accommodate a range of weight necessary to permit the wheel fork assembly 20 to tuck up and/or the distance the wheel fork assembly 20 is allowed to tuck up.

A preferred bumper 73 is generally made form a polyester-based elastomer and is preferred because of its durability, resistance to gasoline, oil, and diesel fuel, and its ability of absorb a significant amount of force in a minimal overall size. An illustrative example of a preferred bumper is the 9677K11 Elastomeric Die Spring from McMaster-Carr. McMaster-Carr is the registered trademark of the McMaster-Carr Supply Company.

Additionally, the bumper could be implemented as a spring or other resilient member which performs the same function.

In a further embodiment, a threaded bore extends inwardly from a bottom of the bumper receiving bore 64 and is positioned to be coaxial with the bumper receiving bore 64, and the bumper includes an aperture extending through the bumper for receiving a screw 74. The screw 74 can be threaded into the threaded bore to secure the bumper 73 to the pivot block 61.

The pivot block coupling means 76 may be a bolt and nut combination, a cotter pin, or other similar arrangement. Preferably the pivot block coupling means 76 is a pin 77 with a slot 78, 79 at each end for receiving an e-ring or snap ring 80, 81 to secure the pin 77 to the pivot block 61. Even more preferably, the pin 77 also includes serrations 82, 83 at each end to swage the pin 77 into the fork member 22 to reduce the likelihood of rotation of the pin 77 and thereby reduce wearing or slotting of the fork member 22 through use.

The Load Block Assembly 90 is not required for the basic operation of the present invention. However, it does provide at least two distinct advantages. First, the load block assembly 90 prevents the wheel fork assembly 20 from pivoting onto the axle assembly 40 when the caster wheel system 10 is lifted off of the ground, such as may occur when the caster wheel assembly 10 is used as the front wheels on a wheel chair and the front wheels are lifted off of the ground to overcome a curb or other obstruction. Second the load block assembly 90 can provide a means of pre-loading or adjustment of the pivot block assembly 60. Generally, the load block assembly 90 comprises a load block 91, a plurality of securing members 93, a set screw 96 and a set screw locking member 98.

The load block 91 is coupled to the fork member 22. Preferably each side portion 23, 27 of the fork member 22 has a pair of apertures 26, 30 and each longitudinal face of the load block 91 has a pair of apertures 92 spaced similarly to those in the side portions 23, 27 of the fork member 22. The securing members 93 may be positioned through the apertures 26, 30 of the side portions 23, 27 and into the apertures 92 of the load block 91. In one embodiment the apertures 92 in the load block 91 extend through the entire load block and the securing members 93 are a pair of bolts and nut combinations to secure the load block to the fork member 22. Alternately, the securing members 93 may be screws, pins, rivets, or other similar devices. When secured to the fork member 22, the load block 91 serves to prevent the wheel fork assembly 20 from over-pivoting with regard to the pivot block assembly 60 by abutting the pivot block 61, and as a spacer between the two side portions 23, 27 of the fork member 22 improving the structural rigidity of the fork member 22.

Additionally, the load block 91 includes a threaded set screw aperture 94 generally perpendicular to the longitudinal axis of the caster wheel system 10, for receiving the set screw 96. The set screw aperture 94 allows the set screw 96 to be positioned through the load block 91 to apply force to the pivot block 61 urging the bumper 73 into contact with the interior face of the front portion 31 of the fork member 22. The set screw locking mechanism 98 is used to selectively secure the set screw 96 to inhibit the set screw 96 from backing off of the pivot block 61 in use. Most preferably the set screw locking mechanism 98 is a lock nut or a nut and lock washer combination.

In still a further embodiment, the load block assembly 90 further includes a stop pad 99. The stop pad 99 may be positioned in a bore 65 in the pivot block 61 generally aligned with the axis of the set screw 96. The stop pad 99 serves as an interface between the set screw 96 and the pivot block assembly 60 to decrease wear of the pivot block 61 during use.

In even still a further embodiment, the stop pad 99 includes a dimple for receiving a face of the set screw 96 to assist in alignment and the engagement of the set screw to the stop pad 99.

As will no doubt be appreciated by those skilled in the art, the present system improves the performance of wheeled vehicles by helping to maintain contact between the wheels and the surface across which the vehicle is to be moved. As an illustrative example and not by way of limitation, assume the present invention is implemented on a conventional wheel chair. Generally the rear wheels will be on a fixed axle and will not give at the wheel chair encounters bumps which not only disrupt the smooth rotation of the wheel encountering the bump, but also creates a torsion force for the frame of the wheel chair as a whole. The bumpers as described above help to keep the wheel in contact with the surface and thereby improve their tracking across the surface.

| Reference No. | Description |
|---|---|
| 1 | |
| 2 | |
| 3 | |
| 4 | |
| 5 | |
| 6 | |
| 7 | |
| 8 | |
| 9 | |
| 10 | Caster Wheel System |
| 11 | |
| 12 | |
| 13 | |
| 14 | |
| 15 | |
| 16 | |
| 17 | |
| 18 | |
| 19 | |
| 20 | |
| 21 | |
| 22 | FORK MEMBER |
| 23 | FORK MEMBER SIDE PORTION |
| 24 | APERTURE |
| 25 | |
| 26 | |
| 27 | FORK MEMBER SIDE PORTION |
| 28 | APERTURE |
| 29 | |
| 30 | |
| 31 | |
| 32 | |
| 33 | |
| 34 | WHEEL |
| 35 | |
| 36 | FLAT WASHER |
| 37 | FLAT WASHER |
| 38 | AXLE BOLT |
| 39 | NUT |
| 40 | AXLE ASSEMBLY |
| 41 | FIRST AXLE SEGMENT |
| 42 | BORE |
| 43 | FIRST COUPLING APERTURE |
| 44 | PLURALITY OF APERTURES |
| 45 | SECOND AXLE SEGMENT |
| 46 | SECOND COUPLING APERTURE |
| 47 | DISTAL END |
| 48 | FASTENER MEMBER |
| 49 | COUPLING MENAS |
| 50 | TOP BEARING |
| 51 | TOP BEARING FIRST FLAT WASHER |
| 52 | TOP BEARING SECOND FLAT WASHER |
| 53 | |
| 54 | BOTTOM BEARING |
| 55 | BOTTOM BEARING FIRST FLAT WASHER |

-continued

| Reference No. | Description |
| --- | --- |
| 56 | BOTTOM BEARING SECOND FLAT WASHER |
| 57 | |
| 58 | |
| 59 | |
| 60 | PIVOT BLOCK ASSEMBLY |
| 61 | PIVOT BLOCK |
| 62 | LONGITUDINAL BORE |
| 63 | LATERAL BORE |
| 64 | BUMPER RECEIVING BORE |
| 65 | |
| 66 | |
| 67 | LONGITUDINAL BUSHING |
| 68 | LONGITUDINAL BUSHING |
| 69 | LATERAL BUSHING |
| 70 | |
| 71 | LATERAL BUSHING |
| 72 | |
| 73 | BUMPER |
| 74 | SCREW |
| 75 | |
| 76 | PIVOT BLOCK COUPLING MEANS |
| 77 | PIN |
| 78 | SLOT |
| 79 | SLOT |
| 80 | E-RING |
| 81 | E-RING |
| 82 | SERRATIONS |
| 83 | SERRATIONS |
| 84 | |
| 85 | |
| 86 | |
| 87 | |
| 88 | |
| 89 | |
| 90 | LOAD BLOCK ASSEMBLY |
| 91 | LOAD BLOCK |
| 92 | APERTURES |
| 93 | SECURING MEMBERS |
| 94 | |
| 95 | |
| 96 | SET SCREW |
| 97 | |
| 98 | SET SCREW LOCKING MEMBER |
| 99 | STOP PAD |
| 100 | |

I claim:

1. A caster wheel system comprising:
an axle assembly for operationally coupling said caster wheel system to a vehicle;
a wheel fork assembly including a wheel fork member and a wheel, rotatably coupled to said wheel fork member; and
a pivot block assembly, said pivot block assembly providing a coupling interface between said axle assembly and said wheel fork assembly, said pivot block assembly being pivotally coupleable to said wheel fork assembly and rotatably coupleable to said axle assembly, whereby said wheel fork member may pivot around an axis defined by
said axle assembly in addition to rotating around its own axis;
a first elongate member adapted for operationally coupling to the vehicle, said first elongate member having a first circumference; said first elongate member having an longitudinal aperature extending along a longitudinal axis of said first elongate member;
a second elongate member having a second circumference, said second circumference being less than said first circumference, a first end of said second elongate member being positionable within said longitudinal aperature of said first elongate member, said second elongate member having a second end, at least said second end of said second elongate member having a threaded circular cross-section;
a coupling means for coupling said second elongate member to said first elongate member when said first end of said second elongate member is positioned within said longitudinal aperture of said first elongate member; and
a nut mated to the threaded circular cross section of said second end of said second elongate member for securing said axle assembly to said pivot block assembly;
a top bearing positionable over said second elongate member and having a top surface abutting an end of said first elongate member, a bottom surface of said top bearing abutting said pivot block assembly, said top bearing reducing a resistance in rotating the pivot block assembly with respect to the axle assembly; and
a bottom bearing positionable over said second elongate member and having a top surface abutting said pivot block assembly, a bottom surface of said bottom bearing assembly abutting said nut, said bottom bearing reducing a resistance in rotating the pivot block assembly with respect to the axle assembly;
wherein both said top bearing and said bottom bearing each further comprise a metal flat washer used in combination with a polyoxymethyene washer, said polyoxymethyne washer abutting said pivot block assembly.

2. The caster wheel system of claim 1, wherein said coupling means further comprises:
said first elongate member having a first coupling aperture extending through said first elongate member, said first coupling aperture being substantially perpendicular to said longitudinal axis of said first elongate member, said first coupling aperture intersecting said longitudinal aperture;
said second elongate member having a second coupling aperture positioned adjacent to said first end of said second elongate member, said second coupling aperture being alignable with said first coupling aperture when said first end of said second elongate member is positioned within said longitudinal aperture of said first elongate member; and
said coupling means being a roll pin positionable through said first and second coupling apertures whereby said second elongate member is coupled to said first elongate member, said roll pin having sufficient diameter when compared to said first and second coupling apertures as to create an interference fit to resist said roll pin from working out of said first and second coupling apertures during normal operation of said caster wheel system.

3. The caster wheel system of claim 1, wherein said first elongate member further comprises a plurality of mounting apertures extending through said first elongate member, each one of said plurality of mounting apertures being positioned substantially perpendicular to said longitudinal axis of said first elongate member, said plurality of mounting apertures providing a height adjustment for coupling said caster wheel system to the vehicle.

4. The caster wheel system of claim 1, wherein said wheel fork member further comprises:
a pair of side position in a spaced arrangement for extending along either side of the wheel;
a front portion joining a first one of said pair of side portions to a second one of said pair of side portions, said front portion maintaining the spaced arrangement of said pair of side portions;

each one of said pair of side portions having an aperture extending therethrough, said aperture being positioned distal from said front portion;

an axle bolt positionable through each one of said apertures extending through said pair of side portions and an aperture extending through an axis of said wheel, said axle bolt rotatably coupling said wheel to said fork member; and a nut mated to said axle bolt for selectively securing said axle bolt to said fork member.

5. The caster wheel system of claim 4, further comprising a pair of flat washers, each one of said flat washers being positioned on said axle bolt between an interior face of an associated one of said side portions and said wheel, said flat washers acting as bearing to reduce friction between said interior face of said side portion and said wheel.

6. The caster wheel system of claim 4, wherein each one of said pair of side portions further comprises plurality of apertures in a spaced array, each one of said plurality of apertures being for selectively receiving said axle bolt, whereby a height of said wheel is adjustable as referenced from a pivot block.

7. A caster wheel system comprising:
an axle assembly for operationally coupling said caster wheel system to a vehicle;
a wheel fork assembly including a wheel fork member and a wheel, rotatably coupled to said wheel fork member; and
a pivot block assembly, said pivot block assembly providing a coupling interface between said axle assembly and said wheel fork assembly, said pivot block assembly being pivotally coupleable to said wheel fork assembly and rotatably coupleable to said axle assembly, whereby said wheel fork member may pivot around an axis defined by
said axle assembly in addition to rotating around its own axis;
wherein said pivot block assembly further comprises:
a pivot block, said pivot block being a rectangular block with a longitudinal bore extending therethrough, said longitudinal bore being for receiving said axle, said pivot block having a lateral bumper receiving bore positioned substantially perpendicular to said longitudinal bore;
a bumper assembly positionable partially within said bumper receiving bore, said bumper assembly abutting an interior face of said wheel fork member whereby said pivot block is urged away from said interior face of said wheel fork member; and
a pivot block coupling means for pivotally coupling said pivot block to said wheel fork member.

8. The caster wheel system of claim 7, wherein said bumper assembly further comprises:
a bumper having a aperture therethrough, said bumper being positionable partially within said bumper receiving bore;
a screw positionable through said aperture of said bumper for securing said bumper to said pivot block;
said bumper compressing when weight is applied to said caster wheel system along its longitudinal axis, said compression allowing said wheel fork assembly to deflect slightly backwards and upwardly.

9. The caster wheel system of claim 8, wherein said bumper comprises an elastomeric material.

10. The caster wheel system of claim 8, wherein said bumper is selected from a group of bumpers each having a unique compression per unit force whereby the amount of deflection is adjustable in terms of weight required and length of the deflection.

11. The caster wheel system of claim 8, wherein said bumper allows for a 0.125 inch deflection upon the application of 25 pounds of force applied along said longitudinal axis.

12. The caster wheel system of claim 7, further comprising at least one longitudinal bushing, said longitudinal bushing being positioned within said longitudinal bore and serving as an interface between said axle and said pivot block whereby wear of the pivot block by the axle is reduced.

13. The caster wheel system of claim 7, wherein said bumper assembly further comprises:
a bumper comprising a spring, said bumper being positionable partially within said bumper receiving bore;
said bumper compressing when weight is applied to said caster wheel system along its longitudinal axis, said compression allowing said wheel fork assembly to deflect slightly backwards and upwardly.

14. The caster wheel system of claim 7, wherein said coupling means further comprises:
said pivot block having a lateral bore extending substantially perpendicular to said longitudinal bore;
said wheel fork member having a pair of apertures being alignable with said lateral bore when said pivot block is positioned for use with said wheel fork member; and
a pivot pin positionable through said lateral bore and said pair of apertures in said wheel fork member, whereby said pivot block is pivotablly coupled to said wheel fork member.

15. The caster wheel system of claim 14, further comprising:
a pair of pivot pin grooves, each one of said pair of pivot pin grooves being positioned adjacent to an associated end of said pivot pin;
a pair of snap rings, each one of said snap rings being positionable in an associated on of said pivot pin grooves, whereby said pivot pin is retained.

16. The caster wheel system of claim 14, further comprising:
a pair of serrated areas, each one of said pair of serrated areas being positioned adjacent to an associated end of said pivot pin, each one of said serrated areas being for engaging an interior of an associated on of said pair of apertures of said wheel fork member, whereby said pivot pin is swaged into place with respect to said wheel fork member to inhibit rotation of said pivot pin with respect to said wheel fork member and limiting the potential for wearing of the wheel fork member by the pivot pin in use.

17. The caster wheel system of claim 14, wherein said pivot block assembly further comprises a pair of lateral bushings, each one of said lateral bushings being positionable in an associated end of said lateral bore, said lateral bushings serving as an interface between said pivot pin and said pivot block to reduce the wear on the pivot block by the pivot pin during use.

18. The caster wheel system of claim 17, wherein each one of said pair of lateral bushings includes a flanged portion, said flanged portion abutting an associated face of said pivot block to reduce the friction between the wheel fork assembly and the pivot block.

19. A caster wheel system comprising:
an axle assembly for operationally coupling said caster wheel system to a vehicle;

a wheel fork assembly including a wheel fork member and a wheel, rotatably coupled to said wheel fork member; and a pivot block assembly, said pivot block assembly providing a coupling interface between said axle assembly and said wheel fork assembly, said pivot block assembly being pivotally coupleable to said wheel fork assembly and rotatably coupleable to said axle assembly, whereby said wheel fork member may pivot around an axis defined by said axle assembly in addition to rotating around its own axis;

wherein said pivot block assembly further comprises:

a pivot block, said pivot block being a rectangular block with a longitudinal bore extending therethrough, said longitudinal bore being for receiving said axle, said pivot block having a lateral bumper receiving bore positioned substantially perpendicular to said longitudinal bore;

a bumper assembly positionable partially within said bumper receiving bore, said bumper assembly abutting an interior face of said wheel fork member whereby said pivot block is urged away from said interior face of said wheel fork member;

a pivot block coupling means for pivotally coupling said pivot block to said wheel fork member;

wherein said bumper assembly further comprises:

a bumper having a aperture therethrough, said bumper being positionable partially within said bumper receiving bore;

a screw positionable through said aperture of said bumper for securing said bumper to said pivot block;

said bumper compressing when weight is applied to said caster wheel system along its longitudinal axis, said compression allowing said wheel fork assembly to deflect slightly backwards and upwardly;

said bumper comprises an elastomeric material;

wherein said bumper is selected from a group of bumpers each having a unique compression per unit force whereby the amount of deflection is adjustable in terms of weight required and length of the deflection;

at least one longitudinal bushing, said longitudinal bushing being positioned within said longitudinal bore and serving as an interface between said axle and said pivot block whereby wear of the pivot block by the axle is reduced;

wherein said coupling means further comprises:

said pivot block having a lateral bore extending substantially perpendicular to said longitudinal bore;

said wheel fork member having a pair of apertures being alignable with said lateral bore when said pivot block is positioned for use with said wheel fork member; and a pivot pin positionable through said lateral bore and said pair of apertures in said wheel fork member, whereby said pivot block is pivotablly coupled to said wheel fork member;

a pair of pivot pin grooves, each one of said pair of pivot pin grooves being positioned adjacent to an associated end of said pivot pin;

a pair of snap rings, each one of said snap rings being positionable in an associated on of said pivot pin grooves, whereby said pivot pin is retained;

a pair of serrated areas, each one of said pair of serrated areas being positioned adjacent to an associated end of said pivot pin, each one of said serrated areas being for engaging an interior of an associated on of said pair of apertures of said wheel fork member, whereby said pivot pin is swaged into place with respect to said wheel fork member to inhibit rotation of said pivot pin with respect to said wheel fork member and limiting the potential for wearing of the wheel fork member by the pivot pin in use;

wherein said pivot block assembly further comprises a pair of lateral bushings, each one of said lateral bushings being positionable in an associated end of said lateral bore, said lateral bushings serving as an interface between said pivot pin and said pivot block to reduce the wear on the pivot block by the pivot pin during use; and wherein each one of said pair of lateral bushings includes a flanged portion, said flanged portion abutting an associated face of said pivot block to reduce the friction between the wheel fork assembly and the pivot block.

20. A caster wheel system comprising:

an axle assembly for operationally coupling said caster wheel system to a vehicle;

a wheel fork assembly including a wheel fork member and a wheel, rotatably coupled to said wheel fork member; and a pivot block assembly, said pivot block assembly providing a coupling interface between said axle assembly and said wheel fork assembly, said pivot block assembly being pivotally coupleable to said wheel fork assembly and rotatably coupleable to said axle assembly, whereby said wheel fork member may pivot around an axis defined by said axle assembly in addition to rotating around its own axis;

a load block assembly coupled to said wheel fork member, said load block assembly serving as a spacer between two side portions of said wheel fork member, at least a portion of said load block assembly abutting said pivot block assembly during normal operation urging a portion of said pivot block assembly towards an interior face of a front portion of said wheel fork member.

21. The caster wheel system of claim 20, wherein said load block assembly further comprises:

a load block having a first plurality of threaded apertures extending into a first side of said load block and a second plurality of threaded apertures extending into a second side of said load block, said first and second plurality of threaded apertures being alignable with apertures through said side portions of said wheel fork member;

a plurality of screws mated to said first and second plurality of apertures into said load block, said plurality of screws removably securing said load block to said wheel fork member;

a set screw aperture extending through said load block from a front face to a back face, said set screw aperture being threaded;

a set screw positionable in said set screw aperture, a base of said set screw being positionable to abut said pivot block assembly for preloading or adjusting a net force between said pivot block assembly and said interior face of said wheel fork member; and a locking nut positionable on said set screw to abut a back face of said load block to inhibit said set screw from working out of position during use of the caster wheel system.

22. The caster wheel system of claim 20, wherein a bottom edge of said load block is generally arcuate to provide clearance for said wheel.

23. A caster wheel system comprising:

an axle assembly for operationally coupling said caster wheel assembly to a vehicle;

a wheel fork assembly including a wheel fork member and a wheel, rotatably coupled to said wheel fork member, said wheel fork member having a front portion between a pair of said portions, said side portions being for extending along either side of said wheel to facilitate rotatably couple said wheel to said wheel fork member;

a pivot block assembly, said pivot block assembly providing a coupling interface between said axle assembly and said wheel fork assembly, said pivot block assembly being pivotally coupleable to said wheel fork assembly and rotatably coupleable to said axle assembly, whereby said wheel fork member may pivot 360 degrees around an axis defined by said axle assembly in addition to rotating around its own axis;

a load block assembly coupled to said wheel fork member, said load block assembly serving as a spacer between said two side portions of said wheel fork member, at least a portion of said load block assembly abutting said pivot block assembly during normal operation urging a portion of said pivot block assembly towards an interior face of said front portion of said wheel fork member;

wherein said axle assembly further comprises:

a first elongate member adapted for operationally coupling to the vehicle, said first elongate member having a first circumference;

said first elongate member having an longitudinal aperture extending along a longitudinal axis of said first elongate member;

a second elongate member having a second circumference, said second circumference being less than said first circumference, a first end of said second elongate member being positionable within said longitudinal aperture of said first elongate member, said second elongate member having a second end, at least said second end of said second elongate member having a threaded circular cross-section;

a coupling means for coupling said second elongate member to said first elongate member when said first end of said second elongate member is positioned within said longitudinal aperture of said first elongate member;

a nut mated to the threaded circular cross section of said second end of said second elongate member for securing said axle assembly to said pivot block assembly;

wherein said coupling means further comprises:

said first elongate member having a first coupling aperture extending through said first elongate member, said first coupling aperture being substantially perpendicular to said longitudinal axis of said first elongate member, said first coupling aperture intersecting said longitudinal aperture;

said second elongate member having a second coupling aperture positioned adjacent to said first end of said second elongate member, said second coupling aperture being alignable with said first coupling aperture when said first end of said second elongate member is positioned within said longitudinal aperture of said first elongate member;

said coupling means, being a roll pin positionable through said first and second coupling apertures whereby said second elongate member is coupled to said first elongate member, said roll pin having sufficient diameter when compared to said first and second coupling apertures as to create an interference fit to resist said roll pin from working out of said first and second coupling apertures during normal operation of said caster wheel system;

wherein said first elongate member further comprises a plurality of mounting apertures extending through said first elongate member, each one of said plurality of mounting apertures being positioned substantially perpendicular to said longitudinal axis of said first elongate member, said plurality of mounting apertures providing a height adjustment for coupling said caster wheel system to the vehicle;

a top bearing positionable over said second elongate member and having a top surface abutting an end of said first elongate member, a bottom surface of said top bearing abutting said pivot block assembly, said top bearing reducing a resistance in rotating the pivot block assembly with respect to the axle assembly; and a bottom bearing positionable over said second elongate member and having a top surface abutting said pivot block assembly, a bottom surface of said bottom bearing assembly abutting said nut, said bottom bearing reducing a resistance in rotating the pivot block assembly with respect to the axle assembly.

24. The caster wheel system of claim 23 further comprising:

wherein said pivot block assembly further comprises:

a pivot block, said pivot block being a rectangular block with a longitudinal bore extending therethrough, said longitudinal bore being for receiving said axle, said pivot block having a lateral bumper receiving bore positioned substantially perpendicular to said longitudinal bore;

a bumper assembly positionable partially within said bumper receiving bore, said bumper assembly abutting an interior face of said wheel fork member whereby said pivot block is urged away from said interior face of said wheel fork member;

a pivot block coupling means for pivotally coupling said pivot block to said wheel fork member;

wherein said bumper assembly further comprises:

a bumper having a aperture therethrough, said bumper being positionable partially within said bumper receiving bore;

a screw positionable through said aperture of said bumper for securing said bumper to said pivot block;

said bumper compressing when weight is applied to said caster wheel system along its longitudinal axis, said compression allowing said wheel fork assembly to deflect slightly backwards and upwardly;

said bumper comprises an elastomeric material;

wherein said bumper is selected from a group of bumpers each having a unique compression per unit force whereby the amount of deflection is adjustable in terms of weight required and length of the deflection;

at least one longitudinal bushing, said longitudinal bushing being positioned within said longitudinal bore and serving as an interface between said axle and said pivot block whereby wear of the pivot block by the axle is reduced;

wherein said coupling means further comprises:

said pivot block having a lateral bore extending substantially perpendicular to said longitudinal bore;

said wheel fork member having a pair of apertures being alignable with said lateral bore when said pivot block is positioned for use with said wheel fork member; and a pivot pin positionable through said lateral bore and said pair of apertures in said wheel fork member, whereby said pivot block is pivotablly coupled to said wheel fork member;

a pair of pivot pin grooves, each one of said pair of pivot pin grooves being positioned adjacent to an associated end of said pivot pin;

a pair of snap rings, each one of said snap rings being positionable in an associated one of said pivot pin grooves, whereby said pivot pin is retained;

a pair of serrated areas, each one of said pair of serrated areas being positioned adjacent to an associated end of said pivot pin, each one of said serrated areas being for engaging an interior of an associated on of said pair of apertures of said wheel fork member, whereby said pivot pin is swaged into place with respect to said wheel fork member to inhibit rotation of said pivot pin with respect to said wheel fork member and limiting the potential for wearing of the wheel fork member by the pivot pin in use;

wherein said pivot block assembly further comprises a pair of lateral bushings, each one of said lateral bushings being positionable in an associated end of said lateral bore, said lateral bushings serving as an interface between said pivot pin and said pivot block to reduce the wear on the pivot block by the pivot pin during use; and wherein each one of said pair of lateral bushings includes a flanged portion, said flanged portion abutting an associated face of said pivot block to reduce the friction between the wheel fork assembly and the pivot block.

25. The caster wheel system of claim 24, wherein said load block assembly further comprises:

a load block having a first plurality of threaded apertures extending into a first side of said load block and a second plurality of threaded apertures extending into a second side of said load block, said first and second plurality of threaded apertures being alignable with apertures through said side portions of said wheel fork member;

a plurality of screws mated to said first and second plurality of apertures into said load block, said plurality of screws removably securing said load block to said wheel fork member;

a set screw aperture extending through said load block from a front face to a back face, said set screw aperture being threaded;

a set screw positionable in said set screw aperture, a base of said set screw being positionable to abut said pivot block assembly for preloading or adjusting a net force between said pivot block assembly and said interior face of said wheel fork member; and a locking nut positionable on said set screw to abut a back face of said load block to inhibit said set screw from working out of position during use of the caster wheel system.

\* \* \* \* \*